United States Patent [19]
Kirschner et al.

[11] Patent Number: 5,438,845
[45] Date of Patent: Aug. 8, 1995

[54] REFRIGERATION DEVICE

[75] Inventors: Mark J. Kirschner, Morristown; Ron C. Lee, Bloomsbury, both of N.J.

[73] Assignee: The BOC Group, Inc., New Providence, N.J.

[21] Appl. No.: 263,230

[22] Filed: Jun. 21, 1994

[51] Int. Cl.[6] .............................................. F28B 9/00
[52] U.S. Cl. ...................................... 62/172; 62/402; 62/57
[58] Field of Search ...................... 62/57, 63, 172, 402

[56] References Cited

U.S. PATENT DOCUMENTS

| | | | |
|---|---|---|---|
| 2,935,723 | 2/1960 | Hagen et al. | 62/402 |
| 3,670,520 | 6/1972 | Bonteil | 62/57 |
| 3,868,827 | 3/1975 | Linhardt et al. | 62/63 |
| 4,057,978 | 11/1977 | Sato et al. | 62/374 |
| 4,166,731 | 9/1979 | Staege | 62/331 |
| 4,317,665 | 3/1982 | Prentice | 62/63 |
| 4,343,634 | 8/1982 | Davis | 62/57 |
| 4,422,302 | 12/1983 | Davis et al. | 62/63 |
| 4,726,195 | 2/1988 | Klee | 62/62 |

*Primary Examiner*—Ronald C. Capossela
*Attorney, Agent, or Firm*—David M. Rosenblum; Larry R. Cassett

[57] ABSTRACT

A refrigeration device in which a heat load is refrigerated within a refrigeration chamber. Refrigerant is supplied, preferably, from a supply of turboexpanded air employing a compressor to compress the air and a turboexpander to expand the compressed air to a low temperature. A venturi-like device such as an ejector circulates the refrigerant within a circulation path within the refrigeration chamber so that heat is transferred from the heat load to the refrigerant. An incoming mass flow rate of the refrigerant is delivered to a high pressure inlet of the venturi-like device and a recirculation mass flow rate of the refrigerant is received within the low pressure inlet from the circulation path after the refrigerant has heat transferred thereto. A high pressure outlet discharges a mixture of the refrigerant that comprises the incoming and recirculation mass flow rates to the circulation path and prior to the heat load. Controls are provided to either control the recirculation mass flow rate of the refrigerant or a by-pass flow of refrigerant in a by-pass line communicating between the high pressure inlet and outlet. Such control acts to control circulation within the circulation path.

6 Claims, 1 Drawing Sheet

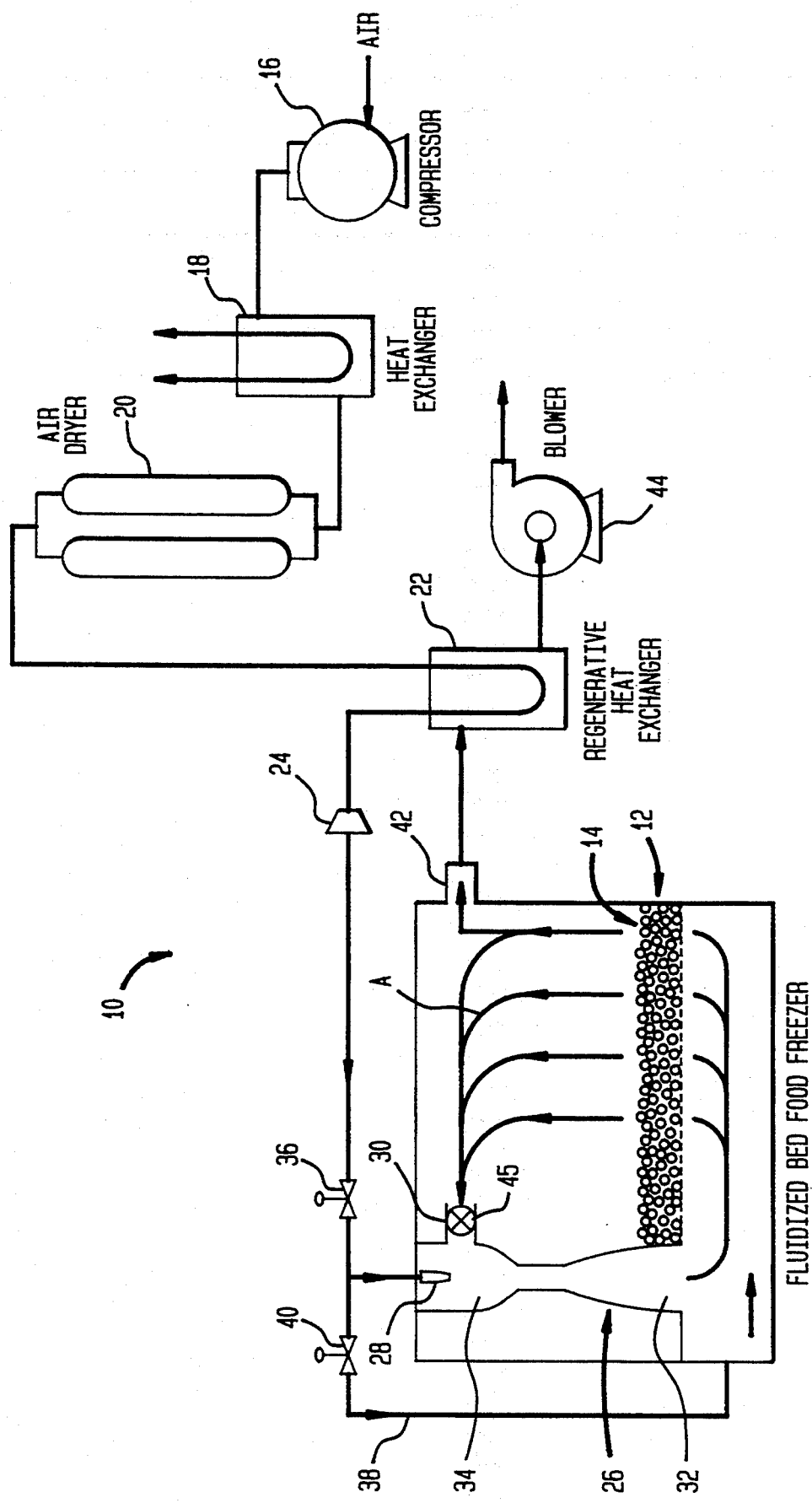

REFRIGERATION DEVICE

BACKGROUND OF THE INVENTION

The present invention relates to a refrigeration device to refrigerate a heat load with a refrigerant, otherwise known as a refrigerator. More particularly, the present invention relates to such a refrigeration device in the form of a fluidized bed food freezer and in which the refrigerant is turboexpanded air. Even more particularly, the present invention relates to such a refrigeration device in which the refrigerant is circulated by a venturi-like device such as an ejector.

The prior art has provided a variety of designs of refrigerators that are used to refrigerate or freeze items. In some refrigerators, a refrigerant is circulated through a forced circulation path to the items, which constitute a heat load, so that heat is transferred from the items to the refrigerant. A particularly advantageous apparatus for effectuating such circulation is a venturi-like device such as an ejector which utilizes the fluid energy of the incoming refrigerant to accomplish such circulation.

In practice, refrigeration is not supplied to a refrigerator at a constant rate due to changes in refrigeration demand. When a venturi-like device is coupled to a refrigerator to produce a required circulation of refrigerant, however, the amount of refrigeration being supplied and the degree of circulation cannot independently be adjusted. Any change in the flow of refrigerant to a venturi-like device will also change the circulation flow produced by such venturi-like device.

The aforementioned inflexibility in the operation of a venturi-like device makes the use of a venturi-like device incompatible with the operation of many particular freezer designs. For instance, in a fluidized bed freezer the circulation is not only used to send refrigerant through a forced circulation path for refrigeration purposes, but also, is used to suspend the items to be frozen in a fluidized bed. If an ejector were utilized to accomplish the fluidization of a fluidized bed freezer, the possible increase or decrease in circulation required by a change in refrigeration requirements would be disruptive to the operation of the fluidized bed. Hence, in a fluidized bed freezer, fluidization is produced by motorized fans which not only consume electricity and introduce a heat load but also add to the complexity and cost of the freezer.

As will be discussed, the present invention provides a refrigeration device that utilizes a venturi-like device in which controls are provided to separately control the circulation produced by the venturi-like device and also, the degree of refrigeration supplied.

SUMMARY OF THE INVENTION

A refrigeration device is provided that has a refrigeration chamber for refrigerating a heat load. A refrigerant supply means is provided for supplying a mass flow rate of refrigerant to refrigerate the heat load and a venturi-like device is provided for circulating the refrigerant within a circulation path located within the refrigeration chamber so that heat is transferred from the heat load to the refrigerant. The venturi-like device has a high pressure inlet for receiving the mass flow rate of the refrigerant from the refrigerant supply means. A low pressure inlet is provided for receiving a re-circulation mass flow rate of the refrigerant from the circulation path after heat is transferred to the refrigerant. Also a high pressure outlet is provided for discharging a combined mass flow rate of the refrigerant, comprising the mass flow rate of the refrigerant received within the high pressure inlet and re-circulation mass flow rates of the refrigerant. The venturi-like device is positioned to discharge the combined mass flow rate to the circulation path and prior to the heat load. An outlet to the refrigeration chamber is provided for discharging an outlet mass flow rate of the refrigerant equal to the mass flow rate of the refrigerant received from the refrigerant supply means. A first control means is provided for controlling the mass flow rate of the refrigerant received within the high pressure inlet. A second control means is associated with the low pressure inlet for controlling the recirculation mass flow rate of the refrigerant. This will in turn control the combined mass flow rate of the refrigerant discharged from the high pressure nozzle to control circulation rate of the refrigerant within the circulation path.

In another aspect, the present invention provides a refrigeration device, as outlined above, in which a by-pass line is provided in communication with the high pressure inlet and the high pressure outlet of the venturi-like device. The high pressure inlet of the venturi-like device receives an incoming mass flow rate of the refrigerant comprising at least part of the mass flow rate of the refrigerant due to possible by-pass flow within the by-pass line. The second control means control the by-pass flow rate of the refrigerant instead of the recirculation mass flow rate of the refrigerant. The by-pass mass flow rate of the refrigerant is equal to a remaining part of the mass flow rate being supplied by the refrigerant supply means so that adjustment of the by-pass mass flow rate in response to change in the mass flow rate will control the incoming and therefore the combined mass flow rates of the refrigerant to in turn control circulation rate of the refrigerant within the circulation path.

In the aforesaid aspects of the present invention, the control of the flow rate of the refrigerant by the first control means in turn controls the total refrigeration supplied to the refrigerating chamber and will thereby increase the refrigeration supplied to the heat load. However, if more refrigerant were simply supplied to the high pressure inlet of the venturi-like device, the circulation rate of the refrigerant within the refrigerant chamber would also increase. By controlling the recirculation within the low pressure inlet or by-pass line, upon an increase or decrease in required refrigerant, circulation within the refrigeration chamber can also be adjusted to remain constant. It is to be noted that a need exists to be able to independently adjust the circulation produced by an ejector independently of any refrigeration requirement, for instance, for fluidization purposes. In this regard, the term "circulation" as used herein and in the claims means the combined mass flow rate of the refrigerant from the venturi-like device and any by-pass mass flow rate in a proper embodiment delivered to the start of the circulation path.

Although the present invention has particular application to a fluidized bed food freezer that uses turboexpanded air, the present invention is not so limited. For instance, the present invention also has applicability to refrigerators in which the refrigerant is a cryogenic liquid such as liquid nitrogen. As used herein and in the claims, a "venturi-like device" is any such device in which a low pressure region is created by a venturi effect to draw the refrigerant into the low pressure region. Examples of venturi-like devices are ejectors, jet pumps, Coanda air movers, etc. "Refrigeration" as that term is used herein and in the claims is any decrease in internal energy which is typically associated with a decrease in the temperature of a heat load. Such temperature decrease can in fact produce freezing of the heat load to be refrigerated but does not imply a requirement for freezing.

BRIEF DESCRIPTION OF THE DRAWINGS

While the specification concludes with claims distinctly pointing out the subject matter that applicants regard as their invention, it is believed that the invention will be better understood when taken in connection with the sole accompanying FIGURE which is a schematic illustration of a refrigeration device in accordance with the present invention.

DETAILED DESCRIPTION

With reference to the sole accompanying FIGURE, a refrigeration device 10 is illustrated in which a refrigeration chamber in the form of a fluidized bed food freezer 12 is illustrated for freezing food such as peas 14. It is to be noted that the present invention has application to other types of refrigeration devices that require circulation through a circulation path during their operation.

In refrigeration device 10, air, after having been filtered, enters a compressor 16 in which the air is compressed. Thereafter, the air is introduced into a heat exchanger 18 to remove the heat of compression from the air. In practice, this is usually a series of compression and heat exchange stages. The air is then dried in an air dryer 20, which can comprise multiple beds of silica gel operating out of phase. Thereafter, the air is further cooled by indirect heat exchange with an outlet flow rate of the air from the fluidized bed freezer 12 within a regenerative heat exchanger 22. In such manner the refrigeration of the exhaust air is conserved. The air is then introduced into a turboexpander 24 in which it is expanded to a low temperature. The mass flow rate of air is supplied to a venturi-like device in the form of a ejector 26 which has a high pressure inlet 28 a low pressure inlet 30 and a high pressure outlet 32.

High pressure inlet receives an incoming mass flow rate of the air and low pressure inlet 30 receives a recirculation mass flow rate of the air. A low pressure region 34 created by a venturi-like effect within ejector 26 draws the recirculation mass flow rate of the air into low pressure inlet 30 and combines it with the incoming mass flow rate of refrigerant entering the high pressure inlet 28 of ejector 26. The sum or combination of these mass flow rates is discharged from high pressure outlet 32 along a circulation path indicated by arrowheads A. The circulation of the air fluidizes peas 14 before the air is drawn into low pressure inlet 30.

A first control valve 36 is provided for controlling the mass flow rate refrigerant supplied to refrigeration chamber 12. First control valve 36 is meant to be illustrative of no change in incoming refrigerant flow. Another possible flow control could be a mechanism to effect the compressor or expanding. When refrigeration requirements increase, control valve 36 is opened and vice-versa. In order to keep the recirculation constant, a by-pass line 38 is provided in communication with high pressure inlet 28 and high pressure outlet 32. A by-pass flow rate of refrigerant within by-pass line 38 is controlled by a second control valve 40. For instance, if first control valve 36 is opened to supply more refrigerant or turbo-expanded air to refrigeration chamber 12, second control valve 40 is opened to increase the by-pass mass flow rate within by-pass line 38 so that the circulation can be adjusted to remain essentially constant in response to the increase in mass flow rate of the incoming refrigerant.

Refrigerating chamber 12 has a discharge outlet 42 to discharge an outlet mass flow rate equal to the mass flow rate of refrigerant entering freezing chamber 12 from turbo-expander 24. This outlet mass flow rate is fed into regenerative heat exchanger 22. A blower 44 can be provided to help exhaust the air.

As an alternative embodiment, by-pass line 38 can be deleted and an alternative second control valve 45 can be set within low pressure inlet 30. In such manner, the recirculation mass flow rate of air entering ejector 26 can be adjusted to adjust the circulation within refrigeration chamber 12. This is not preferred in case of food refrigeration applications because frozen food particles and the like can be drawn into second control valve 45. This could lead to potential blockage and impose valve cleaning requirements. Moreover, in any possible embodiment of applicants' invention, first and second control valves 36 and 40 (and alternative second control valve 45) could be automatically controlled to, for instance, adjust temperature and circulation in accordance with the circulation and refrigeration requirements of refrigeration device 10.

Although the present invention had been discussed with reference to a preferred embodiment, it will be understood by those skilled in the art that numerous changes, additions, and omissions may be made without departing from the spirit and scope of the present invention.

We claim:
1. A refrigeration device comprising:
a refrigeration chamber for refrigerating a heat load;
refrigerant supply means for supplying a mass flow rate of refrigerant to refrigerate said heat load;
a venturi-like device for circulating said refrigerant through a circulation path located within said refrigeration chamber so that heat is transferred from said heat load to said refrigerant;
said venturi-like device having a high pressure inlet for receiving said mass flow rate of said refrigerant from said refrigerant supply means, a low pressure inlet for receiving a recirculation mass flow rate of said refrigerant from said circulation path after said heat is transferred to said refrigerant, and a high pressure outlet for discharging a combined mass flow rate of said refrigerant, comprising said mass flow rate of said refrigerant received within said high pressure inlet and said recirculation mass flow rate of said refrigerant;
said venturi-like device positioned to discharge said combined mass flow rate to said circulation path and prior to said heat load;
an outlet to said refrigeration chamber for discharging an outlet mass flow rate of said refrigerant equal to said mass flow rate of said refrigerant received from said refrigerant supply means;
first control means for controlling said mass flow rate of said refrigerant received within said high pressure inlet; and
second control means associated with said low pressure inlet for controlling said recirculation mass flow rate of said refrigerant and thereby said com- bined mass flow rate of said refrigerant discharged from said high pressure nozzle to control circulation of the refrigerant within said circulation path.

2. A refrigeration device comprising:

a refrigeration chamber for refrigerating a heat load;

refrigerant supply means for supplying a mass flow rate of refrigerant to refrigerate said heat load;

a venturi-like device for circulating said refrigerant through a circulation path located within said refrigeration chamber so that heat is transferred from said heat load to said refrigerant;

said venturi-like device having a high pressure inlet for receiving an incoming mass flow rate of said refrigerant comprising at least part of said mass flow rate of said refrigerant, a low pressure inlet for receiving a recirculation mass flow rate of said refrigerant from said circulation path after said heat is transferred to said refrigerant, and a high pressure outlet for discharging a combined mass flow rate of said refrigerant comprising said incoming and said recirculation mass flow rates of said refrigerant;

said venturi-like device positioned to discharge said mixture of said refrigerant to said circulation path and prior to said heat load;

an outlet to said refrigeration chamber for discharging an outlet flow rate of said refrigerant equal to said mass flow rate of said refrigerant supplied from said refrigerant supply means;

first control means for controlling the mass flow rate of said refrigerant;

a by-pass line in communication with said high pressure inlet and said high pressure outlet of said venturi-like device; and second control means for controlling a by-pass mass flow rate of said refrigerant, flowing within said by-pass line, said by-pass mass flow rate equal to a remaining part of said mass flow rate of said refrigerant so that control of said by-pass mass flow rate will also control said incoming and therefore said combined mass flow rates of said refrigerant to control circulation of the refrigerant within said circulation path.

3. The refrigeration device of claim 2 or claim 1, wherein said refrigerant comprises turboexpanded air.

4. The refrigeration device of claim 3 wherein said refrigerant supply means comprises:

a compressor for compressing air;

the heat exchanger for removing heat of compression from the air;

an air dryer for removing moisture from the air;

a turboexpander connected to said first control means for turboexpanding the air to produce said refrigerant;

a blower for drawing the refrigerant from the outlet of the refrigeration chamber;

a recirculation heat exchanger interposed between said air drying means and said turboexpander and said outlet and said blower directly exchange heat between the air prior to being turboexpanded within the turboexpander with the exhaust mass flow rate of the air.

5. Refrigeration device of claim 2 or claim 1, wherein said refrigeration chamber comprises a fluidized bed freezer for fluidizing said heat load.

6. The refrigeration device of claim 5 wherein:

a compressor for compressing air;

the heat exchanger for removing heat of compression from the air;

an air dryer for removing moisture from the air;

a turboexpander connected to said first control means for turboexpanding the air to produce said refrigerant;

a blower for drawing the refrigerant from the outlet of the refrigeration chamber;

a recirculation heat exchanger interposed between said air drying means and said turboexpander and said outlet and said blower directly exchange heat between the air prior to being turboexpanded within the turboexpander with the exhaust mass flow rate of the air.

* * * * *